(12) United States Patent
Suzuki et al.

(10) Patent No.: US 6,641,858 B1
(45) Date of Patent: Nov. 4, 2003

(54) PHOSPHOR LAYER FOR RADIATION IMAGE CONVERSION PANEL

(75) Inventors: Hideki Suzuki, Kanagawa (JP); Katsuhiro Kohda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 547 days.

(21) Appl. No.: 09/588,571

(22) Filed: Jun. 7, 2000

(30) Foreign Application Priority Data

Jun. 7, 1999 (JP) .......................... 11-159045

(51) Int. Cl.$^7$ .............. B05D 5/06; B05D 5/12; G03G 5/00; A61B 6/00; C09K 11/08
(52) U.S. Cl. ............. 427/64; 427/65; 250/472.1; 250/483.1; 250/582; 252/301.16; 252/301.4 R; 252/301.4 F; 252/301.4 H; 106/461
(58) Field of Search .............. 156/230, 231, 156/242, 247, 288; 427/61, 64, 65, 66, 67, 68; 250/472.1, 483.1, 488.1, 581; 252/301.16, 301.4, 301.4 F, 301.4 H; 106/400, 461

(56) References Cited

U.S. PATENT DOCUMENTS 4,563,580 A * 1/1986 Ishizuka et al. ......... 250/327.2

FOREIGN PATENT DOCUMENTS

| JP | A4315100 | 11/1992 |
|---|---|---|
| JP | A836099 | 2/1996 |

OTHER PUBLICATIONS

Genekoplis, Christie, "Transport Processes and Unit Operations", 1993, Pentice–Hall, 3$^{rd}$. ed. pp. 141–143.*

* cited by examiner

*Primary Examiner*—J. A. Lorengo
(74) *Attorney, Agent, or Firm*—Birch, Stewart, Kolasch & Birch, LLP

(57) ABSTRACT

A method of preparing a phosphor layer coating solution of a radiation image conversion panel is provided, in which, at least a phosphor, a binder, a cross-linking agent which cross-links the binder by being heated, and a solvent are constituent components of the phosphor layer coating solution. The method includes a phosphor dispersing step in which the constituent components other than the cross-linking agent are mixed and stirred to disperse the phosphor such that a phosphor dispersion is prepared, a cooling step in which the phosphor dispersion prepared in the phosphor dispersing step is cooled, and a cross-linking agent adding step in which the cross-linking agent is added to the phosphor dispersion cooled in the cooling step and the dispersion is stirred such that the cross-linking agent is thoroughly mixed therewith.

13 Claims, 1 Drawing Sheet

PHOSPHOR LAYER FOR RADIATION IMAGE CONVERSION PANEL

BACKGROUND OF THE INVENTION

1. Field of the Invention

The present invention relates to a method of preparing a phosphor layer coating solution of a radiation image conversion panel used for a radiation image conversion method which utilizes a stimulable phosphor, and to a method of manufacturing the radiation image conversion panel.

2. Description of the Related Art

As a method used in place of a conventional radiography, there has been known a radiation image conversion method which uses a stimulable phosphor, for example, as disclosed in Japanese Patent Application Laid-Open (JP-A) No. 55-12145. This method uses a radiation image conversion panel containing a stimulable phosphor (which may also be referred to as an accumulative phosphor sheet). In this method, a stimulable phosphor of a radiation image conversion panel absorbs radiation transmitted through a subject or emitted from an object to be examined. Thereafter, the stimulable phosphor is excited over time by an electromagnetic wave (excited light) such as a visible ray or an infrared ray to thereby allow the radiation energy stored in the stimulable phosphor to be released as fluorescence (stimulable emission). An electric signal is obtained by photoelectrically reading the fluorescence, and the radiation image of the subject or the object to be examined is produced as a visible image on the basis of the obtained electric signal. On the other hand, after the remaining image on the radiation image conversion panel whose reading has been finished is erased, the radiation image conversion panel is ready for the next photographing. Namely, the radiation image conversion panel is repeatedly used in the above-described manner.

In accordance with the radiation image conversion method, as compared with a case of using radiography in which a combination of a conventional radiographic film and sensitizing paper is used, there is an advantage in that it is possible to obtain a radiation image having a large amount of information with even less exposure (radiation) dose. Further, in the conventional radiography, the radiographic film is used up each time photographing is carried out. In contrast, in the radiation image conversion method, because the radiation image conversion panel is repeatedly used, it is beneficial from the viewpoints of conservation of resources and economic efficiency.

A radiation image conversion panel used in the radiation image conversion method is formed by, as a fundamental structure, a support and a phosphor layer which is provided on a surface of the support and contains a stimulable phosphor. The phosphor layer is generally formed by the stimulable phosphor and a binder which contains and supports the stimulable phosphor in a dispersed state. The stimulable phosphor has a property of exhibiting a stimulable luminescence when the phosphor absorbs radiation such as X-rays and is then irradiated by excited light. Therefore, the radiation transmitted through a subject or emitted from an object to be examined is absorbed in the phosphor layer of the radiation image conversion panel in proportion to the radiation dose (amount of emitted or transmitted radiation). A radiation image of the subject or the object to be examined is formed on the panel as an image storing radiation energy. The image storing radiation energy can be emitted as stimulable emission by irradiating excited light thereon, and the image storing radiation energy can be imaged by photoelectrically reading the stimulable emission and converting it into an electric signal.

The phosphor layer is formed by preparing a phosphor layer coating solution which is prepared by adding a stimulable phosphor and a binder to a suitable solvent, and dispersing and dissolving them, and then applying the phosphor layer coating solution to the surface of the support and drying it. In the preparation of the phosphor layer coating solution, a cross-linking agent is added in view of enhancing the mechanical strength of the obtained phosphor layer. For example, JP-A Nos. 4-315100 and 8-36099 disclose examples in which a polyurethane resin is used as a binder and an isocyanate is used as a cross-linking agent.

However, when a solution, which contains a stimulable phosphor, binder and a cross-linking agent having the action of cross-linking a binder by being heated, such as isocyanate, is stirred in order to disperse the stimulable phosphor sufficiently, the temperature of the solution is raised by the stirring such that a cross-linking reaction of the cross-linking agent is partially caused, and the stimulable phosphor is not uniformly dispersed and may aggregate. Further, there may be cases in which aggregation of the binder itself is caused by the cross-linking reaction of the cross-linking agent.

When the phosphor layer is formed by using a phosphor layer coating solution in which aggregation is caused, defects at the surface due to the aggregation of the stimulable phosphor tend to be caused and the image quality may be lowered due to deterioration of structural mottle.

Cooling the entire stirring container by cooling water or the like has been considered in order to prevent the temperature of the solution from being raised. In this case, the cooling effect of the cooling water affects only a portion of the solution contacting a wall portion of the stirring container such that the temperature of the entire solution within the stirring container cannot be kept constant. Accordingly, within the stirring container, the temperature of small portions of the solution subjected to stress due to stirring is raised. Water used for cooling water is usually well water. Although the temperature of well water itself is lower than an ordinary temperature, because cooling is carried out only from the outside of the stirring container, the cooling efficiency is not sufficient to keep the temperature of the solution within the stirring container constant. As a result, because the stirring for dispersing the phosphor is carried out for a long time, the temperature of the solution is raised. As described above, a rise in the temperature of the solution cannot be avoided merely by cooling the whole stirring container by cooling water or the like, and aggregation due to the cross-linking reaction by the cross-linking agent cannot be prevented. Further, unpreferable aggregation of stimulable phosphor cannot be prevented.

SUMMARY OF THE INVENTION

An object of the present invention is to provide a method of preparing a phosphor layer coating solution which enables manufacture of a radiation image conversion panel which has a superior condition and superior structural mottle, while enabling enhancement of mechanical strength due to the addition of a cross-linking agent, and a method of manufacturing a radiation image conversion panel.

The above-described object is accomplished by the present invention. A first aspect of the present invention is a method of preparing a phosphor layer coating solution for a radiation image conversion panel, comprising the steps of:

(a) providing at least a solvent, a phosphor, a binder, and a cross-linking agent which cross-links the binder by being heated, for constituent components; (b) preparing a phosphor dispersion by mixing and stirring the constituent components, except for the cross-linking agent, to disperse the phosphor; (c) cooling the phosphor dispersion; and (d) adding the cross-linking agent to the phosphor dispersion and stirring until a substantially uniform mixture is obtained.

A second aspect of the present invention is a method of manufacturing a radiation image conversion panel comprising the steps of: (a) preparing a phosphor dispersion by mixing and stirring at least a solvent, a phosphor and binder together; (b) cooling the phosphor dispersion; (c) preparing a phosphor layer coating solution by adding a cross-linking agent to the phosphor dispersion after the step of cooling, and stirring; and (d) forming a phosphor layer by applying the phosphor layer coating solution across a surface of a support.

In the present invention, drawbacks, which are caused by a phosphor layer coating solution which contains a cross-linking agent having the action of cross-linking a binder by being heated, are solved by providing the cross-linking agent adding step after the phosphor dispersing step.

Namely, the phosphor is sufficiently stirred and dispersed in a liquid state in which the cross-linking agent is not contained (phosphor dispersing step). Then, the phosphor solution which generates heat is cooled (cooling step) and the cross-linking agent is added thereto (cross-linking agent adding step). The phosphor dispersing step is separated from the cross-linking agent adding step such that the phosphor dispersing step and the cross-linking agent adding step can be respectively carried out at optimum conditions. As a result, a phosphor layer coating solution can be prepared without any aggregation being caused. In this way, since a radiation image conversion panel is formed by using the phosphor layer coating solution which does not contain aggregates and in which the phosphor is sufficiently dispersed, an extremely excellent surface condition of the phosphor can be obtained and superior structural mottle can also be provided. Further, the effect of enhancing the mechanical strength due to the addition of the cross-linking agent can also be exhibited.

DESCRIPTION OF THE PREFERRED EMBODIMENTS

Figure 1:
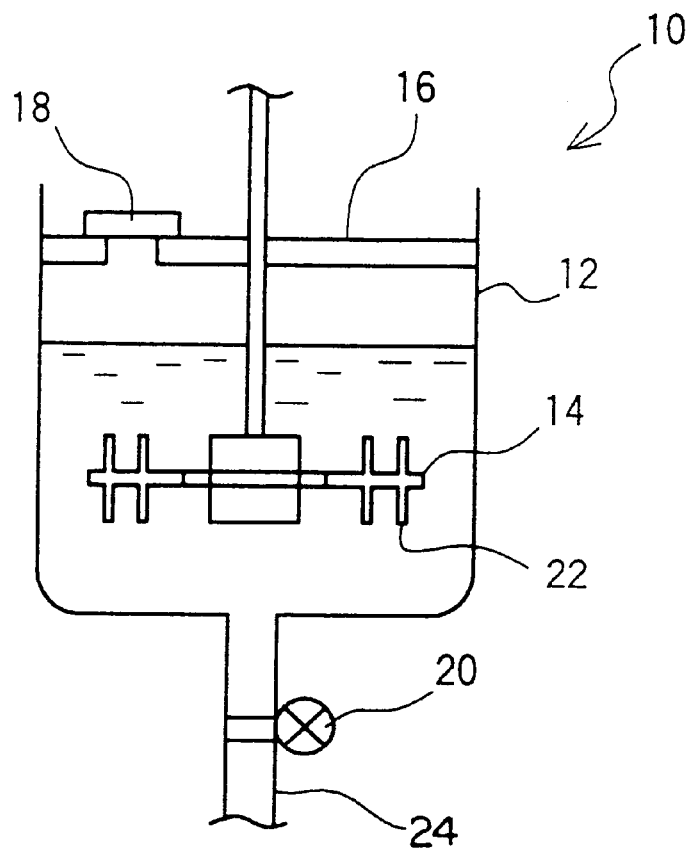
FIG. 1 is a schematic cross-sectional view showing one example of a stirring device to which a manufacturing method of the present invention is applied.

The present invention will be described in detail hereinafter.

Composition of Phosphor Layer Coating Solution
(1) Binder

Examples of a binder used in the present invention include, but are not limited to, natural polymer substances including protein such as gelatin or the like, polysaccharide such as dextran or the like, or a gum arabic, and synthetic polymer substances such as polyvinylbutyral, polyvinyl acetate, nitrocellulose, ethyl cellulose, copolymer of vinylidene chloride and vinyl chloride, polyalkyl(meta) acrylate, copolymer of vinyl chloride and vinyl acetate, polyurethane, cellulose acetate butylate, polyvinyl alcohol, linear polyester, or the like and any combination or mixture thereof. Examples of especially preferable binder include nitrocellulose, linear polyester, polyalkyl(meta)acrylate, polyurethane, a mixture of nitrocellulose and linear polyester, and a mixture of nitrocellulose and polyalkyl (meta)acrylate.

(2) Phosphor

As described above, a phosphor used in the present invention is a phosphor which exhibits a stimulable (an accelerated-phosphorescent) luminescence when excited light is irradiated thereon after radiation was irradiated thereon. In view of a practical use, a phosphor which exhibits the stimulable luminescence in a wavelength range from 300 to 500 nm due excitation by light in wavelength range from 400 to 900 nm is desirable. Examples of the phosphor preferably used for the radiation image conversion panel include a bivalent europium-activated alkaline earth metal halide based phosphor and/or a cerium-activated rare earth oxyhalide based phosphor because they exhibit an luminescence having high illuminance. Here, the present invention is not limited to the use of the above-mentioned phosphors. Any phosphor may be used as long as it exhibits the stimulable luminescence when excited light is irradiated thereon after radiation is irradiated thereon.

(3) Solvent

Examples of a solvent for preparing a coating solution include aromatic based solvents such as toluene, xylene, or the like, ketones such as methyl ethyl ketone, methyl isobutyl ketone, or the like, esters such as methyl acetate, ethyl acetate, butyl acetate, or the like, ethers such as dioxane, ethylene glycol monoethyl ether, ethylene glycol monomethyl ether, or the like, and mixtures thereof.

(4) Cross-Linking Agent

Any cross-linking agent may be used in the present invention as long as it has a cross-linking property which cross-links a binder by being heated. Examples of the cross-linking agent include, for example, isocyanate, melamine resin, melamine based amino resin, benzoguanamine based amino resin, urea resin, polyamide resin, acrylic resin, or the like. Among them, isocyanate is preferable from the viewpoints of having a compatibility with various resins, non-yellowing ability (non-color change to yellow), and flexibility.

(5) Other Components

Various additives such as a dispersing agent for enhancing a dispersibility of the phosphor in the coating solution and a plasticizer for enhancing a bonding strength between a binder and the phosphor in a formed phosphor layer or the like, may be mixed with the phosphor layer coating solution.

Preparation of Phosphor Layer Coating Solution
1. Phosphor Dispersing Step

In the present invention, firstly, a solution in which (1) binder, (2) phosphor, and (5) other components are dissolved in (3) solvent is prepared. Here, a density of the binder in the solution is 5 to 50% by weight and more preferably 10 to 30% by weight. Further, 15 to 25% by weight is most preferable.

A mixing ratio of the binder to the phosphor (binder:phosphor) varies in accordance with a characteristic of a desired radiation image conversion panel, types of the phosphor or the like, but the mixing ratio is generally selected from a range of 1:1 to 1:100 (weight ratio) and more preferably from a range of 1:8 to 1:40 (weight ratio). Further, a range of 1:15 to 1:30 (weight ratio) is most preferable.

It is preferable that constituent components other than the phosphor are mixed in advance so as to prepare the solution and then the phosphor is mixed while stirring the solution.

Due to sufficient and uniform dissolution and mixing of the binder and other components, the phosphor is extremely uniformly and sufficiently dispersed in the solution.

Then, the constituent components other than a cross-linking agent are mixed and stirred to disperse the phosphor such that a dispersion comprising phosphor is prepared. Although a stirring device and a stirring condition are not especially limited, the stirring condition which can disperse the phosphor completely is desirable.

Figure 2:
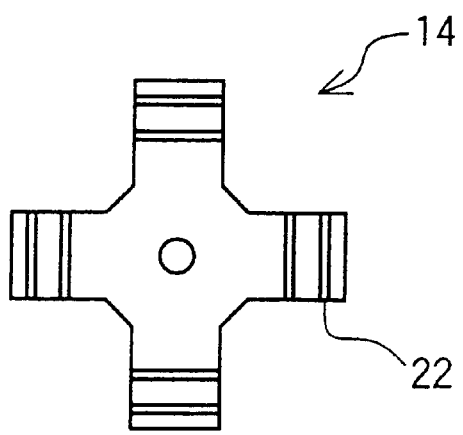
FIG. 2 is a plan view of a stirring blade of the stirring device of FIG. 1.

For example, in a case in which the dispersion is stirred in a stirring device 10 (inner diameter of stirring container 12: 260 mm, solution capacity: 10 l) shown in FIG. 1 by using a cross-shaped stirring blade 14 as shown in FIG. 2 (plan view in which only the stirring blade 14 is extracted from FIG. 1), a diameter of the stirring blade 14 (maximum length of blade) is preferably from 100 mm to 200 mm. A stirring speed is preferably 200 rpm to 5000 rpm. The stirring device 10 shown in FIG. 1 is provided with a cover 16 which has a charging slot 18 at an opening portion of the stirring container 12, and a drain piping 24 having a valve 20 at a lower portion thereof. At least one of fin 22 are disposed at the stirring blade 14 so as to stand vertically in the above and below directions. The fins preferably stand in a range of 2 mm to 50 mm from the stirring blade 14. The stirring speed is, in the stirring device shown in FIGS. 1 and 2, at least 1500 rpm, but it is different from types of the stirring device. The stirring time is at least 30 minutes and more preferably at least 60 minutes.

2. Cooling Step

Temperature of the phosphor dispersion obtained by the phosphor dispersing step is raised due to stress at the time of stirring. Accordingly, it is necessary to cool the phosphor dispersion before adding a cross-linking agent thereto in order to suppress proceeding of a cross-linking reaction at the time of adding the cross-linking agent into the dispersion. The cross-linking reaction should be conducted after the cross-linking agent is dispersed sufficiently.

A cooling method is not especially limited and the dispersion may be cooled to a desired temperature by simply allowed to stand. When the dispersion is positively cooled, a circumferential portion of the stirring container is made to contact with running water such that the dispersion is cooled even more rapidly to a desired temperature.

Cooling in the cooling step is carried out until the temperature of the phosphor dispersion becomes such as to suppress a proceeding speed of the cross-linking reaction when the cross-linking agent was added to the solution at that temperature. Cooling is carried out until the temperature of the dispersion is no more than 30° C. and more preferably no more than 25° C. On the other hand, if the phosphor dispersion is too cooled, a coating characteristic is lowered and therefore, the temperature of the phosphor dispersion after being cooled is no less than 15° C. and more preferably no less than 20° C.

3. Cross-Linking Agent Adding Step (4) Cross-linking agent is added to the phosphor dispersion which has been cooled in the cooling step and the resultant solution is stirred such that the cross-linking agent is thoroughly mixed therewith.

Although an added amount of the cross-linking agent depends on types of the cross-linking agent and the binder, the mechanical strength of the desired phosphor layer, or the like, it is preferably 1 to 80% by weight and more preferably 3 to 30% by weight based on an amount of the binder.

Stirring is carried out to an extent that the cross-linking agent is thoroughly mixed with the dispersion. From the viewpoint of suppressing a raise in temperature of the solution, it is preferable to carry out stirring at more generous condition than the condition of the stirring in the phosphor dispersing step, i.e., it is preferable to slow down the stirring speed or to shorten the stirring time. For example, in the stirring device shown in FIGS. 1 and 2, the stirring speed is preferably 100 to 3000 rpm and/or the stirring time is preferably 5 to 180 minutes.

A phosphor layer coating solution is prepared as described above.

4. Storage Method (Stabilization of Solution)

The temperature of the phosphor layer coating solution prepared by the above-described manner is desirably adjusted in a range of 15 to 30° C. while stirring the solution before the solution is applied to the support. By stirring the solution, it can be stabilized the solution while a excellent dispersed state of the phosphor can be maintained. Further, by adjusting the temperature of the solution in a range of 15 to 30° C., a cross-linking reaction due to the cross-linking agent can be suppressed.

A stirring speed must be the same as the stirring speed in the cross-linking agent adding step or is slower than that. For example, in the stirring device shown in FIGS. 1 and 2, the stirring speed is preferably 10 to 500 rpm.

From the viewpoint of the stabilization of the solution, it is desirable to carry out the stirring and the temperature adjustment for a constant period of time, for example, preferably for 10 minutes to 24 hours and more preferably for 1 hour to 6 hours.

Manufacturing of Radiation Image Conversion Panel

A phosphor layer of a radiation image conversion panel is formed by uniformly applying the phosphor layer coating solution prepared by the above-described manner onto a support surface.

Materials of a support of the radiation image conversion panel can be selected from conventionally known materials. Among them, a film of plastic material such as cellulose acetate, polyester, polyethylene terephthalate, polyamide, polyimide, triacetate, polycarbonate, or the like is preferable.

In the known radiation image conversion panel, in order to strengthen a bonding of the support and the phosphor layer or to enhance sensitivity or an image quality (including sharpness and grainness) of the radiation image conversion panel, there has been known that an adhesive property imparting layer is provided by applying polymer such as gelatin or the like onto a support surface at a side at which the phosphor layer is formed, or a light reflecting layer formed by light reflecting material such as titanium dioxide or the like, or a light absorbing layer formed by light absorbing material such as carbon black, or the like is provided.

The support used in the present invention can be also provided with above-described various layers. Further, structures of the layers can be optionally selected in accordance with an object or an application of a desired radiation image conversion panel. Further, as disclosed in JP-A No. 58-200200, in order to enhance sharpness of an obtained image, small irregularities may be formed on a surface of a support at a stimulable phosphor layer side (which surface is the surface of the adhesive property imparting layer, the light reflecting layer, the light absorbing layer or the like if one of these layers is provided on the support at the stimulable phosphor layer side).

After forming a film on the surface of the support by the above-described manner, the film is dried. In this way, forming of the phosphor layer on the support surface is completed. Although the thickness of the phosphor layer varies in accordance with a characteristic of a desired radiation image conversion panel, types of the phosphor, a mixing ratio of the binder to the phosphor, or the like, it is usually 20 $\mu$m to 1 mm, but the preferable thickness is 50 to 500 $\mu$m.

The phosphor layer coating solution may be applied by using an usual coating means, such as a doctor blade, a roll coater, a knife coater, or the like.

Drying conditions after coating the film are not especially limited. It does not present a problem if the conditions are temperature and time conditions so as to sufficiently dry the solvent contained in the film.

The phosphor layer can be formed by directly applying the coating solution onto the support as described above. However, another method can be adapted in order to form the layer. For example, a phosphor layer may be separately formed by applying the coating solution onto a sheet (provisional support) such as a glass plate, a metallic plate, a plastic sheet, or the like and drying the solution. Then, the phosphor layer formed on the sheet is pressed on the support and/or adhered to the support by using an adhesive. Thereafter, the sheet (provisional support) is removed.

Generally, a protective layer is formed on the phosphor layer in order to physically and chemically protect the phosphor layer. Examples of materials of the protective layer include, for example, polyurethane resin, polyacrylic resin, cellulose derivative, polymethyl methacrylate, polyester resin, epoxy resin, organic solvent soluble fluororesin, or the like. The protective layer is formed by uniformly applying a coating solution which contains protective layer forming materials, such as the above-described polymer, on the surface of a phosphor layer by using a doctor blade or the like, and drying the solution. The protective layer may be formed at the same time of forming the phosphor layer by a simultaneous double-layer coating method.

Preferable material of the protective layer is organic solvent soluble fluororesin (for example, fluoroolefin-vinyl ether copolymer, polytetrafluoroethylene, and modified body thereof). The above-described fluororesin is preferably cross-linked because the strength of the resin is enhanced and durability as the protective layer is also enhanced. The above-described coating solution containing the protective layer forming materials may include a resin other than the fluororesin, a cross-linking agent, a hardening agent, and further an anti-yellowing agent, or the like.

An edge protection layer may be formed at an end portion (side surface portion) of at least one side of a radiation image conversion panel in order to enhance a conveyance resistance characteristic, especially an impact resistance, and a pollution resistance.

Examples of a coating agent for the edge protection layer include, but are not especially limited to, a linear polyester or a polymer mixture of a linear polyester and a copolymer of a vinyl chloride and a vinyl acetate disclosed in JP-A No. 62-3700, and an organic solvent soluble fluororesin disclosed in JP-A No. 4-2998, or the like. Further, examples of the coating agent include a coating agent formed by a silicone based polymer and a polyisocyanate disclosed in JP-A No. 7-140300. A radiation image conversion panel in which the edge protection layer is formed by the above-mentioned coating agents accomplishes extremely high conveyance resistance characteristic, especially the impact resistance and the pollution resistance and therefore, it is preferable in the present invention.

The radiation image conversion panel is formed by the above-described manner. In order to enhance sharpness of an obtained image, at least one layer of respective above-described layers may be colored by a coloring agent which absorbs excited light and does not absorb stimulable emission (see Japanese Patent Application Publication (JP-B) No. 59-23400).

EXAMPLES

The present invention will be specifically explained by examples and comparative examples, but it is not limited to the following examples.

Example 1

Preparation of Phosphor Layer Coating Solution
a) Phosphor Dispersing Step

A stirring device 10 (inner diameter of stirring container 12: 260 mm, capacity of stirring container 12: 10 l) shown in FIG. 1 was used as a stirring device. A diameter of a stirring blade 14 (maximum length of blade) was 140 mm and a plurality of fins each having a length of 7 mm stood in the above and below directions.

2367 g of a polyurethane elastomer solution, as a binder, (a solution obtained by dissolving BANDEX T-5265H [solid] manufactured by Dainippon Ink and Chemicals, Incorporated in advance in methyl ethyl ketone such that a density of solids was 15% by weight), 100 g of an epoxy resin, as an anti-yellowing agent, (EPICOAT #1004 [solid] manufactured by Yuka Shell Epoxy Inc.), and 1300 g of methyl ethyl ketone as a solvent were charged into the stirring container 12 and mixed together (temperature of the solution: 22° C.). The resultant solution was stirred at a peripheral velocity of about 5.8 m/sec and 10000 g of a phosphor, which has a weight average grain diameter Dm=5 $\mu$m (BaFBr$_{0.85}$I$_{0.15}$: Eu$^{2+}$) was charged in the solution from a charging opening 18 (temperature of the solution: 22° C.).

After charging the phosphor, the solution was stirred at a rotational speed of 2500 rpm (peripheral velocity was about 18 m/sec) for 1 hour while flowing cooling water around the stirring container 12 so as to disperse the phosphor, and then a phosphor dispersion was prepared. The temperature of the phosphor dispersion after being dispersed was 40° C. Then, a valve 20 was opened so that the phosphor dispersion was collected from a drain piping 24. The viscosity of the collected phosphor dispersion was 45 ps (this value was measured at 25° C.).
b) Cooling Step The resultant phosphor dispersion was stirred at a rotational speed of 600 rpm (peripheral velocity was about 4.4 m/sec) until the temperature thereof was lowered to 25° C. while flowing cooling water around the stirring container 12.
c) Cross-Linking Agent Adding Step A solution was prepared by adding 20 g of methyl ethyl ketone to 45 g of polyisocyanate (KORONATE HX manufactured by Nippon Polyurethane Kogyo Co., Ltd. [proportion of solids was 100%]) which was a cross-linking agent. The resultant solution was stirred with a spatula and then the solution was added to the phosphor dispersion cooled in b) cooling step while stirring and cooling conditions of the cooling step were maintained. Immediately after the addition was completed, a rotational speed was raised to 2500 rpm and the solution was stirred for 20 minutes to prepare a phosphor layer coating solution A. The temperature of the phosphor layer coating solution A after being stirred for 20 minutes was 28° C. Then, the valve 20 was opened so that a portion of the phosphor layer coating solution A was collected from the drain piping 24. The viscosity of the collected phosphor layer coating solution A was 40 ps (this value was measured at 25° C.).

d) Stabilization of Solution

The phosphor layer coating solution A was stirred at a low speed (at a rotational speed of 800 rpm) while flowing cooling water around the stirring container 12 to stabilize the solution A within a range of 22 to 25° C.

Forming of Phosphor Layer

A polyethylene terephthalate sheet whose surface was processed by a parting agent having a thickness of 188 μm (a silicone resin was formed with a thickness of 0.1 μm due to heat-curing) was prepared as a provisional support.

A support was prepared such that a shading layer comprising carbon black, calcium carbonate, silica, and a binder (nitrocellulose and polyester resin) (a composition ratio of carbon black, calcium carbonate, silica, and a binder was 10:21:16:53 in that order) was applied, to a thickness of about 20 μm, onto one side of the polyethylene terephthalate sheet whose both surfaces were mixed with barium sulfate (10% by weight) (MELINEX #992 manufactured by DuPont Co., Inc., thickness: 350 μm). Further, an undercoating layer having a thickness of 20 μm was formed by applying a soft acrylic resin (CRISCOAT P-1018GS manufactured by Dainippon Ink and Chemicals Incorporated., 20% toluene solution) onto a surface of the above polyethylene terephthalate sheet opposite the side the shading layer was formed.

The resultant phosphor layer coating solution A was fed to a geser at a constant amount of flow (160 ml/min) by a pump and was applied, to a coating width of 300 mm, onto the processed surface of the provisional support at a feeding speed of the provisional support of 1 m/min. The applied provisional support was conveyed to an oven and dried at 80° C. for 8 minutes and cooled. Then it was taken up. In this way, a phosphor layer sheet in which the phosphor layer having a thickness of 330 μm, which is a thickness after being dried, was formed on the temporary support.

The phosphor layer was removed from the resultant phosphor layer sheet. Then, the removed phosphor layer and the support were superposed such that the phosphor layer contacts with the undercoating layer of the support and a calendaring processing (heating-and-compressing processing) was continuously carried out upon the laminated phosphor layer and support. Conditions of the calendaring processing were such that a pressure was 500 kgW/cm², the temperature of a roll at the side with which the phosphor contacted was 75° C., the temperature of a roll at the side with which the support contacted was 75° C., a feeding speed was 1.0 m/min. By carrying out the calendaring processing, the phosphor layer was completely fused to the support via the undercoating layer (layer thickness: 230 μm, filling density: 3.35 g/cm³).

Manufacturing of Radiation Image Conversion Panel

Further, the support on which the above-described phosphor layer was provided and a polyethylene terephthalate film (which is referred to as "PET film" hereinafter) having a thickness of 9 μm in which an unsaturated polyester resin solution (VYLON 30SS manufactured by Toyobo Co., Ltd.) was applied and dried so as to form an adhesive layer of the film (an applied amount of adhesive: 2 g/m²), were superposed such that the phosphor layer of the support contacted with the adhesive layer of the PET film. Then, the superposed support and the polyethylene terephthalate film were adhered each other by a laminate roll so as to form a protective layer on the phosphor layer.

A radiation image conversion panel of Example 1 was manufactured in the above-described manner.

Example 2

A phosphor layer coating solution B was prepared by the same manner as that of Example 1 except that 60.6 g of a polyisocyanate (NP-1000 manufactured by Mitsui Toatsu Chemicals, Inc., proportion of solids was 74.2%) was used as a cross-linking agent in Manufacturing of Phosphor Layer Coating Solution in Example 1. The temperature of the phosphor layer coating solution B after being stirred in c) Cross-Linking Adding Step was 28° C. When, the valve 20 was opened and the phosphor layer coating solution B was collected from the drain piping 24, the viscosity of the collected phosphor layer coating solution B was 39 ps (25° C.).

Further, the phosphor layer was formed and then the radiation image conversion panel was manufactured by the same manners as those of Example 1 except that the phosphor layer coating solution B was used. As a result, a radiation image conversion panel of Example 2 was manufactured (thickness of phosphor layer: 225 μm, filling density: 3.38 g/cm³).

Comparative Example 1

A phosphor layer coating solution C was prepared by the same manner as that of Example 1 except that 45 g of a polyisocyanate, as a cross-linking agent, (KORONATE HX manufacture by Nippon Polyurethane Kogyo Co., Ltd., proportion of solids was 100%) was added at the same time other constituent components other than the phosphor were charged into the stirring container 12 in a) Phosphor Dispersing Step of Manufacturing of Phosphor Layer Coating Solution of Example 1 and b) Cooling Step and c) Cross-Linking Agent Adding Step were omitted. The temperature of the phosphor layer coating solution C after being dispersed was 39°. When the valve 20 was opened and the phosphor layer coating solution C was collected from the drain piping 24, the viscosity of the collected phosphor layer coating solution C was 43 ps (25°). d) Stabilization of Solution was carried out as in Example 1 (for 60 minutes).

Further, the phosphor layer was formed and then the radiation image conversion panel was manufactured by the same manners as those of Example 1 except that the phosphor layer coating solution B was used. In thid way, a radiation image conversion panel of Comparative Example 1 (thickness of phosphor layer: 230 μm, filling density: 3.35 g/cm³) was manufactured.

Comparative Example 2

A phosphor layer coating solution D was prepared by the same manner as that of Comparative Example 1 except that 60.6 g of polyisocyanate (NP-1000 manufactured by Mitsui Toatsu Chemicals, Inc., which was the same as that used in Example 2, proportion of solids was 74.2%) was used as the cross-linking agent, which was added at the same time of charging the other constituent components other than the phosphor into the stirring container 12. The temperature of the phosphor layer coating solution D after being dispersed was 41°. When the valve 20 was opened and a part of the phosphor layer coating solution D was collected from the drain piping 24, the viscosity of the phosphor layer coating solution D was 45 ps (25°). d) Stabilization of the solution was carried out as in Example 1 (for 60 minutes).

Further, the phosphor layer was formed and the radiation image conversion panel was manufactured by the same manner as that of Example 1 except that the phosphor layer coating solution D was used. In this way, a radiation image conversion panel of Comparative Example 2 (thickness of phosphor layer: 225 μm, filling density: 3.37 g/cm$^3$) was manufactured.

Evaluation Test

Respective evaluation tests shown below were carried out with respect to respective resultant radiation image conversion panels.

Surface State

Surface states of respective obtained radiation image conversion panels were visually observed and evaluated. Results are shown in the following Table 1.

Grainness

Each radiation image conversion panel was subjected to irradiation of X ray (10 mR) via an MTF chart by using a tungsten vessel (lamp voltage was 80 kVp) and then excited by He-Ne laser light (wavelength was 632.8 nm). Thereafter, stimulable emission emitted from each radiation image conversion panel was received by a photoreceptor (photomultiplier having a spectral sensitivity of S-5). The received light was converted to an electric signal to obtain an image. Grainness (RMS) of the obtained 10 mR image was measured. Grainness (RMS) values at 10 mR reflect a structural mottle very well and are preferably small. Results are shown in the following Table 1.

TABLE 1

|  | Surface State | RMS (10 mR) |
| --- | --- | --- |
| Example 1 | good | $0.35 \times 10^{-2}$ |
| Example 2 | good | $0.36 \times 10^{-2}$ |
| Comparative Example 1 | small aggregates | $0.48 \times 10^{-2}$ |
| Comparative Example 2 | small aggregates | $0.47 \times 10^{-2}$ |

As shown in the above Table 1, as compared with the radiation image conversion panels of Comparative Examples, the radiation image conversion panels of Examples had superior surface state, superior grainness, and superior mechanical strength of the phosphor layer.

In accordance with the present invention, the method of preparing the phosphor layer coating solution and the method of manufacturing the radiation image conversion panel were able to be provided, in which the radiation image conversion panel which had a excellent surface state and a superior structural mottle could be manufactured, while maintaining an enhancement of the mechanical strength due to addition of the cross-linking agent.

What is claimed is:

1. A method of preparing a phosphor layer coating solution for a radiation image conversion panel, comprising the steps of:

(a) providing, as constituent components, at least a solvent, a phosphor, a binder, and a cross-linking agent which cross-links the binder by being heated;

(b) preparing a phosphor dispersion by mixing and stirring the constituent components, except for the cross-linking agent, to disperse the phosphor;

(c) cooling the phosphor dispersion; and (d) adding the cross-linking agent to the phosphor dispersion and stirring until a substantially uniform mixture is obtained.

2. The method of claim 1, wherein the step of providing at least a solvent, a phosphor, a binder and a cross-linking agent, includes providing isocyanate for the cross-linking agent.

3. The method of claim 1, wherein the step of cooling is carried out until temperature of the phosphor dispersion is no more than 30° C.

4. The method of claim 3, wherein the step of cooling includes cooling the phosphor dispersion to a temperature of no less than 15° C.

5. The method of claim 1, wherein the step of providing at least a solvent, a phosphor, a binder, and a cross-linking agent, includes selecting a binder from the group consisting of nitrocellulose, linear polyester, polyalkyl(meta)acrylate, polyurethane, a mixture of nitrocellulose and linear polyester, and a mixture of nitrocellulose and polyalkyl (meta)acrylate.

6. The method of claim 1, wherein the step of providing at least a solvent, a phosphor, a binder, and a cross-linking agent, includes providing a phosphor that exhibits stimulable luminescence in a wavelength range from 300 to 500 nm due excitation by light in a wavelength range from 400 to 900 nm.

7. The method of claim 1, wherein the step of providing at least a solvent, a phosphor, a binder, and a cross-linking agent, includes providing a phosphor that is at least one of a bivalent europium-activated alkaline earth metal halide based phosphor and a cerium-activated rare earth oxyhalide phosphor.

8. The method of claim 1, wherein the step of preparing a phosphor dispersion includes mixing a ratio of binder to phosphor in a range of 1:8 to 1:40 by weight.

9. The method of claim 1, wherein the step of preparing a phosphor dispersion includes the substeps of:

(a) preparing a solution by mixing the solvent and binder; and (b) adding the phosphor to the solution while stirring.

10. The method of claim 1, wherein the step of adding the cross-linking agent, includes adding an amount of the cross-linking agent from 1 to 80 percent by weight of the weight of the binder in the phosphor dispersion.

11. The method of claim 1, wherein the step of adding the cross-linking agent, includes adding an amount of the cross-linking agent from 3 to 30 percent by weight of the weight of the binder in the phosphor dispersion.

12. The method of claim 1, wherein the step of preparing a phosphor dispersion includes stirring with a cross-shaped stirring blade having at least one vertically standing fin.

13. The method of claim 1, wherein stirring in the step of adding the cross-linking agent is carried out at least one of a slower stirring speed and a shorter stirring time than stirring in the step of preparing a phosphor dispersion.

* * * * *